(No Model.)

T. WALL.
MOTOR.

No. 295,314. Patented Mar. 18, 1884.

Attest.
Sidney P. Hollingsworth
Walter S. Dodge

Inventor
Thomas Wall,
by Dodge Son,
Attys.

UNITED STATES PATENT OFFICE.

THOMAS WALL, OF SPRINGFIELD, OHIO.

MOTOR.

SPECIFICATION forming part of Letters Patent No. 295,314, dated March 18, 1884.

Application filed January 14, 1884. (No model.)

*To all whom it may concern:*

Be it known that I, THOMAS WALL, of Springfield, in the county of Clarke and State of Ohio, have invented certain Improvements in Motors, of which the following is a specification.

My invention relates to that class of motors and like machinery in which a shaft or wheel is rotated continuously in one direction by a swinging or oscillating movement of a lever carrying a clutch; and the improvement consists in a novel construction of the clutch and the combination thereof with operating devices, as hereinafter explained and claimed.

Figure 1:
Figure 1:
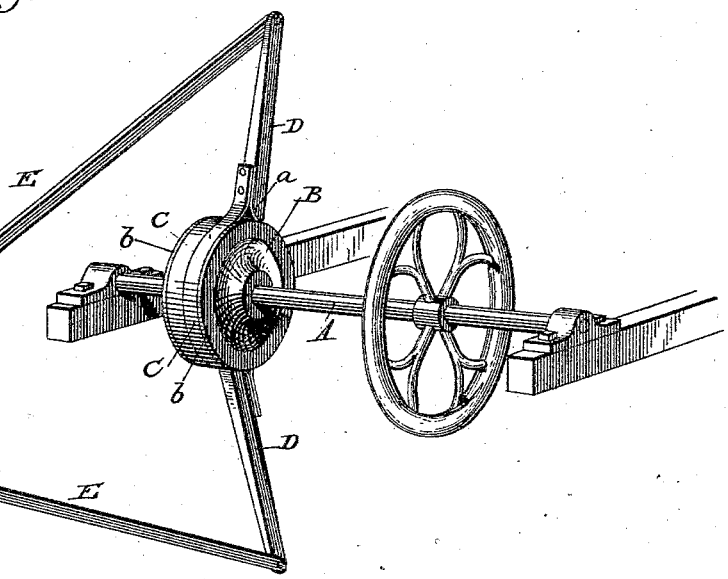
Figure 2:
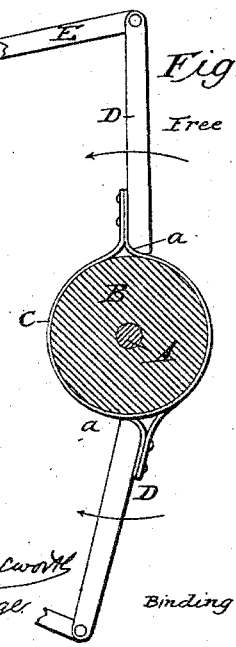
Figure 3:
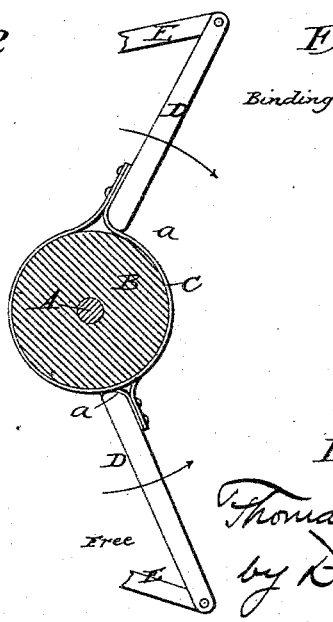

In the accompanying drawings, Figure 1 is a perspective view of my improved machine; and Figs. 2 and 3, side face views of the hub, showing the lever in different positions.

A great many forms of friction-clutches have hitherto been made or proposed, alone and in combination with levers or other mechanism, for imparting motion to machinery through their use and operation. Such prior devices have generally consisted either of a toothed hub or disk and pawls or dogs arranged to engage with said teeth, or with friction-pawls, rollers, or clamping devices arranged to lock against the inner face of an annular rim, or to cramp and lock upon said rim. Such devices are objectionable, for the reason that the teeth wear rapidly away in use, or that an excessive strain is brought upon the annular rim when the latter constructions are adopted. To overcome these difficulties I adopt the construction shown in the drawings, in which—

A indicates a shaft to which a continuous rotary motion in one direction is to be imparted, and B a hub or disk secured rigidly thereon. The hub B is encircled by a band or strap, C, of steel or other strong and elastic metal, both ends of which are secured firmly to lever or arm D, as shown in Figs. 1, 2, and 3. As also shown in these figures, the end of that side or face of the lever or arm to which the ends of the band are secured is rounded or curved, so as to present a curved face, $a$, in the direction of the length of the band, but a plane or straight face transversely thereto, so that if the lever be tipped or rocked at its outer end while its inner end stands at rest, or practically so, the ends of the band will be drawn over said curved face and then be tightened upon the drum or hub B, so that a continuation of the movement of said lever will cause a rotation of the hub, and of the shaft to which it is secured. The extent of movement required to cause the band to bind upon or clamp the hub is very slight, so that almost the entire vibration or movement of the lever is utilized to rotate the shaft. In order to insure the proper binding or clamping action of the band, it is necessary that it should be quite flexible and elastic, particularly at the point where it bends over the end of the arm or lever D. In order to render the rotation of the shaft both continuous and regular, the hub or disk B is made with a face sufficiently broad to receive two bands, C, which are kept in position by circumferential flanges $b$, formed upon the hub, as shown in Fig. 1, each band being provided with a lever or arm, D, to cause the tightening of the band and the rotation of the shaft, as explained. The two arms D project from the hub in diametrically-opposite directions, and have their curved faces $a$ turned in opposite directions, as shown in Figs. 2 and 3, or arranged so that if both arms D be moved simultaneously in either direction one band will be tightened and the other will be free, as will be readily understood upon referring to Figs. 2 and 3. The arms D are connected by pitmen or links E to a pendulous lever, F, or to a crank, a vibrating lever, or other device capable of moving the links or pitmen back and forth longitudinally.

In the drawings I have represented a pendulous lever provided with a foot-piece or stirrup, G, to adapt the device to be operated by foot.

The device is found in practice to give excellent results, each band clamping quickly upon the movement of its arm or lever in one direction, and releasing the hub instantly upon the termination or reversal of such movement. If the band should bind just at the completion of an actuating stroke, the rotation of the hub would carry the band forward sufficiently to cause it to release itself, as will be readily understood. No difficulty of this nature—that is, the momentary binding and the slight drag or retarding action that would follow—has been met with in practice. The wear is very slight and the action perfectly silent.

The hub may be loose on the shaft and belted, geared, or otherwise connected with machinery to be driven.

The precise form of the end of the lever D is not essential, though I prefer that shown.

Having thus described my invention, what I claim is—

1. The herein-described motor, consisting of shaft A, hub B, bands C C, levers D D, attached to the ends of the respective bands and extending in different directions from the hub, pitmen E E, connected with the ends of the levers D D, and a swinging lever, F, or its equivalent, connected with the pitmen, substantially as and for the purpose set forth.

2. In a motor, a clutch consisting of a hub, a flexible band encircling said hub, and a lever attached to the ends of the band and having its lower end curved, substantially as shown and described, whereby it is caused to tighten the band upon the hub when moved in one direction and to loosen it when moved in the reverse direction.

3. In a motor, a clutch consisting of a hub, a flexible band encircling the hub, and a lever, D, the ends of the band being secured to the side face of the lever, substantially as shown and described, whereby a movement of the lever in one direction is caused to bend or draw the band across its end, and thereby tighten it upon the hub, and a reverse movement of the lever is caused to loosen the band, substantially as set forth.

THOMAS WALL.

Witnesses:
O. B. TROUT,
CHASE STEWART.